US012431265B2

(12) United States Patent
Mansson et al.

(10) Patent No.: US 12,431,265 B2
(45) Date of Patent: Sep. 30, 2025

(54) HIGH-RATE MANUFACTURING OF THERMOPLASTIC COMPOSITES WITH ELECTRICALLY AND THERMALLY CONDUCTIVE CONSTITUENTS

(71) Applicant: Purdue Research Foundation, West Lafayette, IN (US)

(72) Inventors: Jan-Anders Mansson, West Lafayette, IN (US); Jessica Ann Lavorata, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 168 days.

(21) Appl. No.: 18/197,694

(22) Filed: May 15, 2023

(65) Prior Publication Data
US 2024/0387075 A1    Nov. 21, 2024

Related U.S. Application Data

(60) Provisional application No. 63/341,724, filed on May 13, 2022.

(51) Int. Cl.
*B29C 65/00* (2006.01)
*H01B 13/00* (2006.01)
(Continued)

(52) U.S. Cl.
CPC ........ *H01B 13/0013* (2013.01); *B29C 65/222* (2013.01); *B29C 65/223* (2013.01); *B29C 65/342* (2013.01); *B29C 65/3432* (2013.01)

(58) Field of Classification Search
CPC ... B29C 65/222; B29C 65/223; B29C 65/342; B29C 65/3432; H01B 13/0013
See application file for complete search history.

(56) References Cited

U.S. PATENT DOCUMENTS 5,454,061 A * 9/1995 Carlson ................. B29C 53/827
392/480
6,005,191 A * 12/1999 Tzeng .................... H01B 11/10
174/110 N
(Continued)

FOREIGN PATENT DOCUMENTS

KR    1020170103194    9/2017

OTHER PUBLICATIONS

Guo, Y. et al., "Enhanced lightning strike protection of carbon fiber composites using expanded foils with anisotropic electrical conductivity," Compos. Part A Appl. Sci. Manuf., vol. 117, No. 17923, pp. 211-218, 2019; available online Nov. 22, 2018.
(Continued)

*Primary Examiner* — Philip C Tucker
*Assistant Examiner* — Nickolas R Harm
(74) *Attorney, Agent, or Firm* — Purdue Research Foundation

(57) ABSTRACT

Provided is a method to form a thermoplastic composite with electrically and thermally conductive constituents. The method may include receiving a molten rod having a polymer composite core. The method may further include embedding the rod with at least one conductive wire. Embedding the rod with the at least one wire may include wrapping the at least one conductive wire around the rod and tensioning the wire thereby causing the wire to at least partially embed into the rod.

10 Claims, 6 Drawing Sheets

(51) Int. Cl.
   *B29C 65/22* (2006.01)
   *B29C 65/34* (2006.01)

(56) References Cited

U.S. PATENT DOCUMENTS

| | | | | |
|---|---|---|---|---|
| 6,051,314 | A * | 4/2000 | Girgis | C03C 25/326 |
| | | | | 525/170 |
| 6,454,251 | B1 * | 9/2002 | Fish | F16F 1/3665 |
| | | | | 156/286 |
| 9,723,657 | B2 * | 8/2017 | Verriele | H05B 3/56 |
| 2005/0279526 | A1 * | 12/2005 | Johnson | H01B 13/0235 |
| | | | | 174/106 R |
| 2013/0167502 | A1 * | 7/2013 | Wilson | D02G 3/00 |
| | | | | 264/165 |
| 2019/0267152 | A1 * | 8/2019 | Kusakari | H01B 1/023 |

OTHER PUBLICATIONS

Gagné, M. et al., "Lightning strike protection of composites," Prog. Aerosp. Sci., vol. 64, pp. 1-16, 2014; available online Sep. 4, 2013.

Wakeman, M. D. et al., "Robotic tow placement for local reinforcement of glass mat thermoplastics (GMTs)," Compos. Part A Appl. Sci. Manuf., vol. 33, No. 9, pp. 1199-1208, 2002.

Wakeman, M. D. et al.—E. Eble, P. Beyeler, T. Herrmann, and J.-A. E. Månson, "Hybrid thermoplastic composite beam structures integrating UD tow, stamped fabric, and over-injection/compression moulding," in Eccm-11, 2004.

Jansson, N. et al., "Optimization of hybrid thermoplastic composite structures using surrogate models and genetic algorithms," Compos. Struct., vol. 80, 2007; available online Jun. 5, 2006.

Jansson, N. et al., "Finite element modelling and testing of an injection moulded generic tow reinforced structure," Compos. Part B Eng., vol. 36, No. 6-7, pp. 487-495, 2005.

Lavorata, J. et al., "Controlling the Geometry of High-rate Thermoplastic Composites via Over-braiding," in SAMPE NeXus, 2021.

Lavorata, J. et al., Conductive overbraid of continuous fiber thermoplastic composite tows. Composite Part B, 258, (2023), 110678; available online Mar. 16, 2023.

Lavorata, J. et al., Consolidation of Thermoplastic Composite Preforms via Tailored Overbraiding. In the Proceedings of the 23rd International Conferences on Composite Materials, (ICCM23), Belfast, Aug. 1-4, 2023.

Lavorata, J. et al., High-Rate Manufacturing of Thermoplastic Composites with Electrically Conductive Constituents. SPE-ACCE, Sep. 7-9, 2022, Novi, Michigan, USA.

Miller, J.D. et al., Mechanical performance of highly loaded tow reinforced hybrid-molded composite structures. Composite Structures, vol. 322, (2023), Article 117311, ISSN: 0020-7462; doi.org/10.1016/j.compstruct.2023.117311; available online Jun. 30, 2023.

Miller, J. D. et al., Tow placement effects on fiber waviness and tensile performance of 3D-tow reinforced hybrid-molded composites. Composites Part B, 2023, vol. 256, Article 110625, 11 pgs.; available online Feb. 21, 2023.

Kang, J.-H. et al., Design of Center Pillar with Composite Reinforcements Using Hybrid Molding Method. Materials, vol. 14, 2021, 21pgs., doi: https://doi.org/10.3390/ma14082047; published Apr. 20, 2021.

Beck, B. et al., Automated 3D Skeleton Winding Process for Continuous-Fiber-Reinforcements in Structural Thermoplastic Components. Springer-Verlag GmbH Germany, part of Springer Nature, 2020, vol. 1, C. Hopmann et al. (Eds.): Advances in Polymer Processing 2020, pp. 150-161, 2020., isbn: 9783662608098. https://doi.org./10.1007/978-3-662-60809-8_13.

Arnaut, K. et al., Analysis of open-hole-tension plates made of short fibre thermoplastic and reinforced with continuous fibre tailored inserts. Journal of Thermoplastic Composite Materials, 2023, vol. 36(3), 1285-1305, doi: 10.1177/0892705720963539.

Hu, T. et al., Lightning performance of copper-mesh clad composite panels: Test and simulation. Coatings, 2019, vol. 9, No. 11, 727; published Nov. 2, 2019.

Joo, S.-J. et al., Design and manufacture of automotive composite front bumper assemble component considering interfacial bond characteristics between over-molded chopped glass fiber polypropylene and continuous glass fiber polypropylene composite. Composite Structures, 2020, vol. 236, https://doi.org/10.1016/j.compstruct.2019.111849; available online Jan. 2, 2020.

Henning, F. et al., Fast processing and continuous simulation of automotive structural composite components. Composites Science and Technology, vol. 171, 2019, pp. 261-279, https://doi.org/10.1016/j.compscitech.2018.12.007. available online Dec. 18, 2018.

Minsch, N. et al., 3D truss structures with coreless 3D filament winding technology. Journal of Composite Materials, 2019, vol. 53(15), pp. 2077-2089, doi: 10.1177/0021998318820583.

Minsch, N. et al., Novel fully automated 3D coreless filament winding technology. Journal of Composite Materials, 2018, vol. 52, No. 22, pp. 3001-3013, doi:10.1177/0021998318759743.

Minsch, N. et al., Analysis of Filament Winding Processes and Potential Equipment Technologies. Procedia CIRP, 2017, vol. 66, pp. 125-130, doi:10.1016/j.procir.2017.03.284.

Kamble, V. D., Optimization of Thermoplastic Pultrusion Process Using Commingled Fibers. Ph.D. dissertation, The University of Alabama at Birmingham, 2008, 92 pgs.

Krause, W. et al., Development of a Technology for Large Scale Production of Continuous Fiber Reinforced Thermoplastics Composites. SPE ANTEC 2005, pp. 2782-2786, May 2005, issn: 18624243.

Bernet, N. et al., Commingled Yarn Composites for Rapid Processing of Complex Shapes. Composites—Part A: Applied Science and Manufacturing, 2001, vol. 32, No. 11, pp. 1613-1626; doi: 10.1016/S1359-835X(00)00180-9.

Wakeman, M.D. et al., A novel Manufacturing Cell for a New Generation of Composite Processing and Applications. In Proceedings of International Conference on Composite Materials (ICCM-12), Paris, France, Jul. 5-9, 1999.

* cited by examiner

HIGH-RATE MANUFACTURING OF THERMOPLASTIC COMPOSITES WITH ELECTRICALLY AND THERMALLY CONDUCTIVE CONSTITUENTS

CROSS REFERENCE TO RELATED APPLICATIONS

This application claims the benefit of U.S. Provisional Application No. 63/341,724 filed May 13, 2022, the entirety of which is incorporated by reference herein.

TECHNICAL FIELD

This disclosure relates to composite tow and, in particular, to over braided composite tow.

BACKGROUND

The aerospace and automotive industries have continued to convert parts from metal to composites as composites offer high specific strength and stiffness. In the automotive industry, the emergence of electrical vehicles has led to metal components being replaced with injection-molded polymer composites as the reduced weight improves the range of the vehicle. The lack of metal has exposed a need for electrically conductive pathways to be present within the vehicle for electromagnetic interference (EMI) shielding as well as for grounding parts to prevent the accumulation of static charge. Also, the number of electronic modules in vehicles has steadily been increasing which require a certain amount of thermal dissipation. The previous metal components could sufficiently disperse this heat, but with the replacement polymers being insulative in nature, additional thermally conductive parts must be incorporated into the system to help dissipate the heat created by these modules.

The aerospace industry has similar conductivity needs to the automotive industry, with the added consideration of lightning strike protection. During lightning strikes, high amounts of current is conducted onto the surface of the aircraft, requiring an electrically conductive pathway to create a path of least resistance for the current to safely exit the aircraft at a different point. The large amounts of current also produce a significant amount of heat, and by incorporating materials with high thermal conductivity properties, this heat is more readily dissipated, thus reducing the chance of thermal damage. Some materials such as graphene and carbon nanotubes are theoretically predicted to have thermal conductivities of 3000 W/mK and 6000 W/mK, respectively. However after processing and experimental implementation, have measured thermal conductivities around 100-200 W/mK. Commonly used metals, such as copper and aluminum, have thermal conductivity of about 386 W/mK and 239 W/mK, respectively.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1A:
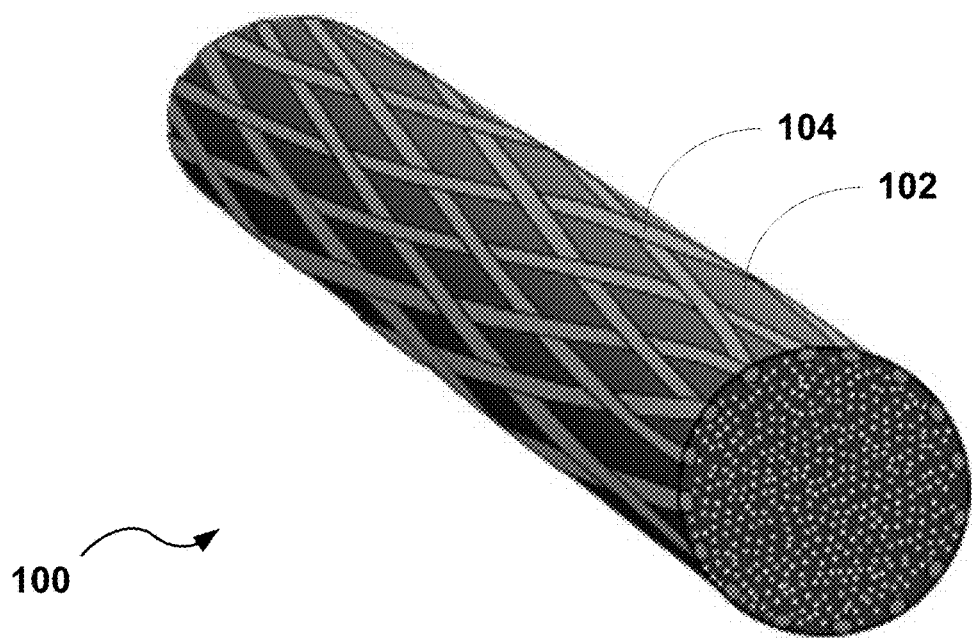
FIG. 1A-C illustrates an example of a conductively reinforced composite tow.

In recent times, metal parts have been replaced by composites in the automotive, aerospace, and other industries. The lack of metal has exposed a need for electrically conductive pathways to be present for electromagnetic interference (EMI) shielding as well as for grounding parts to prevent the accumulation of static charge.

Research to improve the conductivity of composites has focused on using conductive fillers or metallic layers within the composite. Conductive fillers, especially carbon-based (e.g. carbon nanotubes and graphene) or metallic (e.g. copper and aluminum) fillers, are compounded into the matrix to increase the composite's conductivity while maintaining a low weight. Because the fillers can only be introduced in small quantities (<15 weight %) due to processing limitations, the overall conductivity of the part is significantly less (<0.5% of copper conductivity) than the individual filler constituents. When the low-conductivity values are coupled with high material cost, conductive fillers are currently not feasible for industry to adopt.

Metallic layers are introduced to laminated composites in the form of a foil or mesh in order to protect aircraft from the large amounts of current that are conducted during lightning strikes. Metal foil is appealing because it is ultrathin, but causes delamination and debonding when molded into composites. Alternatively, metal meshes come in a variety of designs and thicknesses, but require additional processing to adhere the mesh to the composite structure. Aluminum and copper are the most used metal materials due to their cost effectiveness and relatively high specific electrical conductivity. However, aluminum may experience galvanic corrosion in the presence of carbon which requires isolation layers to be introduced in the layup. Copper, while being a slightly denser material than aluminum, does not require these additional layers, but requires a thicker mesh to be used to minimize the area damaged by the lightning strike.

A promising alternative to conductive fillers and laminated composites is hybrid composites. This approach introduces localized reinforcement or functionality by embedding a composite preform into an injection-molded part. Previous work has demonstrated the utility and feasibility of this approach by embedding unidirectional thermoplastic tow into injection-molded parts for structural reinforcement. However, if the unidirectional tow can be made conductive, the preform can dissipate heat more effectively and transport electricity through the resulting part. This paper examines one method of introducing functionality (electrical and thermal conductivity) to composite tow by incorporating metallic wires into the tow without compromising the weight, cost, or processability of the final part.

Building on the existing multi-tow (M-TOW) line, a new approach to functionalization of the resulting tow by incorporating metallic material into the process's overbraiding stage is provided.

Figure 1B:
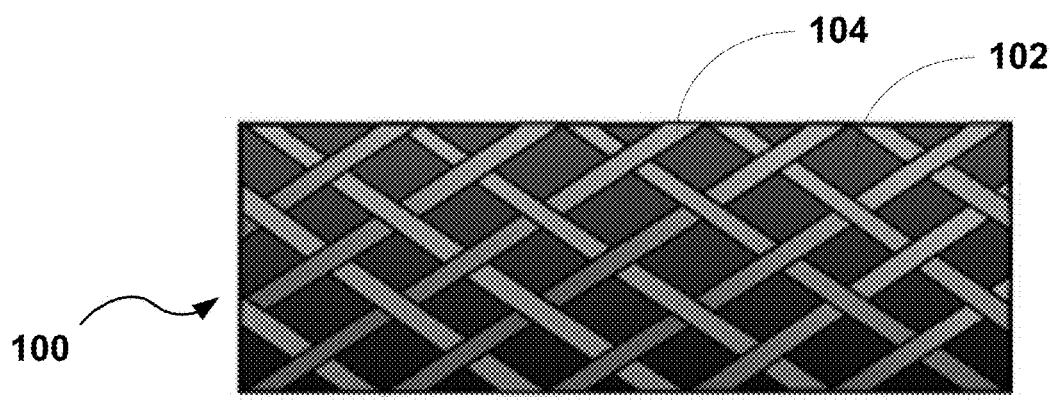
Figure 1C:
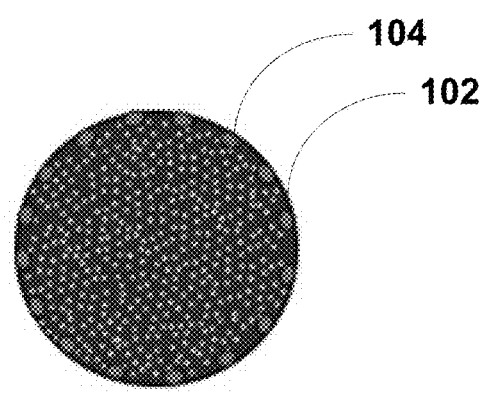

FIG. 1A-C illustrates an example of a conductively reinforced composite tow. FIG. 1A. illustrates a perspective view of the tow. FIG. 1B illustrates a side view of the tow. FIG. 1C illustrates a cross-section view of the tow. Only a portion of the tow is shown in FIGS. 1A-C.

The tow may include a rod 102 (also referred to as a core) comprising unidirectional pre-impregnated fiber composites, which gives the tow its high-performance mechanical properties. The core material can may include any polymer (e.g. polypropylene, polyamide, etc) and reinforcing material (glass fiber, carbon fiber, etc). The tow may further include an overbraid 104, which confines the shape and maintains consolidation during subsequent 3-D forming operations. A technical advancement provided herein is that the overbraid may include a plurality of metal wires which are braided around, and slightly embedded into, the core.

By way of example, the core may be the same material as the M-TOW core described in J. Lavorata and J.-A. E. Mansson, "Controlling the Geometry of High-rate Thermoplastic Composites via Over-braiding," in *SAMPE Nexus*, 2021. which is hereby incorporated by reference. For example, the core may be 40 weight % E-glass-reinforced polypropylene prepreg. The prepreg may be slit into eleven tapes 11 mm wide×0.60 mm thick. When consolidated and compacted, the final M-TOW® has a diameter of 9 mm. The biaxial overbraid for the non-conductive reference M-TOW consisted of eight bobbins of dry 300 Tex E-glass fiber. For the conductive M-TOW® comparison, various sizes of electrolytic tough pitch (ETP) copper were used during overbraiding and compared during analysis. An overview of M-TOW® samples used is provided in Table 1.

TABLE 1

Overview of overbraided M-TOW samples

| Sample description | AWG[†] size used for overbraiding | Wire diameter (mm) | # overbraided wires used |
|---|---|---|---|
| GF × 8 | — | — | 8* |
| 30 AWG × 8 | 30 | 0.254 | 8 |
| 30 AWG × 16 | | | 16 |
| 24 AWG × 8 | 24 | 0.510 | 8 |
| 24 AWG × 16 | | | 16 |
| 18 AWG × 8 | 18 | 1.024 | 8 |
| 18 AWG × 16 | | | 16 |

*GF × 8 was overbraided with dry E-glass fiber
[†]American wire gauge

Figure 2:
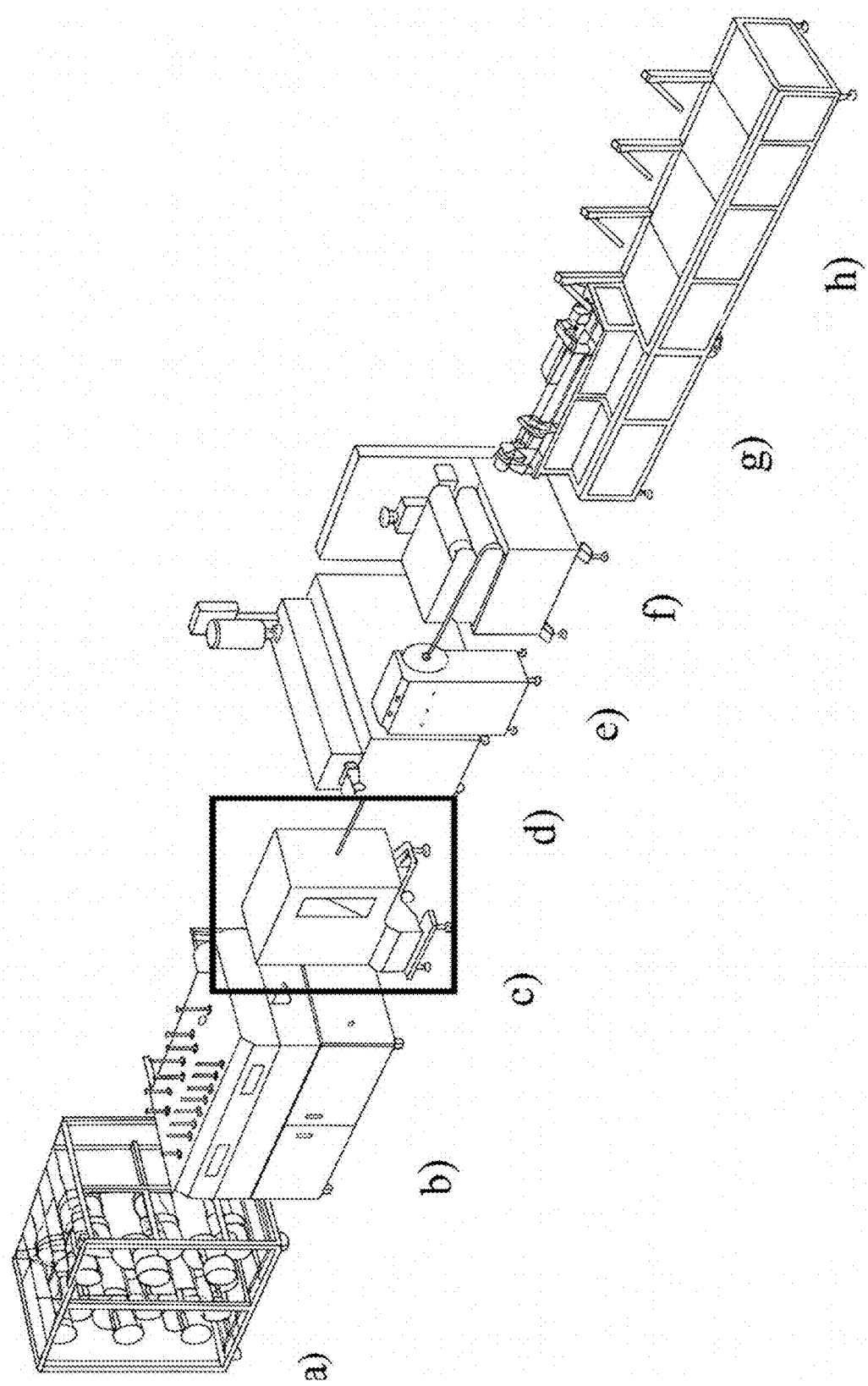
FIG. 2 illustrates a manufacturing system for the overbraded tow.

FIG. 2 illustrates a manufacturing system for the conductively reinforced composite tow. The manufacturing system may include a creel (a), an oven (b), a braider (c), an extruder (d), a cooler (e), a puller (f), a cutter (g), and a stacker (h).

The tow produced in the various examples experimentation was produced at a rate of 0.8 m/min according to a modified M-TOW manufacturing process. The original M-TOW manufacturing process is described in Eelcee-Ltd., "Over-braided hybrid material manufacturing system," South Korea Patent 0103194, 2017, which is incorporated by reference in its entirety herein.

According to some embodiments, the creel (a) holds up to 16 spools of thermoplastic tape at a specified tension. The tapes follow a series of pins to remain separated until entering the oven (b). In the oven, the prepreg tapes are heated above their melt temperature and compacted into a single tow. Subsequently, the tow passes through a heated tube maintaining the tow's molten state, and enters the braider (c). At the braiding stage of the process, the braid applies a force to the tow, causing the matrix resin to "squeeze-out" and infiltrate the over-braid. This pressure increases the core's fiber volume fraction and improves tape consolidation. After exiting the braider, the over braided tow passes through an extruder-coating die (d). The die is sized to apply a thin coat of polymer over the tow, similar to the process used for wire-coating. This overcoating is designed to promote a stronger bond with the material used in subsequent overmolding processes.

As previously discussed, the tow may be over braided with a metallic wiring. Upon exiting the oven (b), the molten tow enters the braider (c). Here, the tow itself acts as a mandrel while metal wires interlace using a maypole braiding. As the tow is being continuously pulled through the manufacturing line, the tensioned yarns apply a radial force to the tow which locks the metal wires place by partially embedding the yarns into the molten polymer. Additionally, these tensioned yarns control the tow's geometry by consolidating the thermoplastic melt into a cylindrical cross-section, shown in FIG. 1C. The tow is slightly molten during the over braiding stage which allows for the wire to partially embed into the tow, resulting in a consolidated and compact circular tow.

The overbraiding wires may serve to ground electronics or dissipate heat in various applications. Furthermore, the rods may be bent at various angles for their application. Such application may include, but not limited to automobiles, consumer electronics, sport equipment, aircraft, water craft, or any other vehicle or device which may benefit from the benefits of thermoplastic composites having electrically or thermally conductive features.

Experimental Testing

Figure 3:
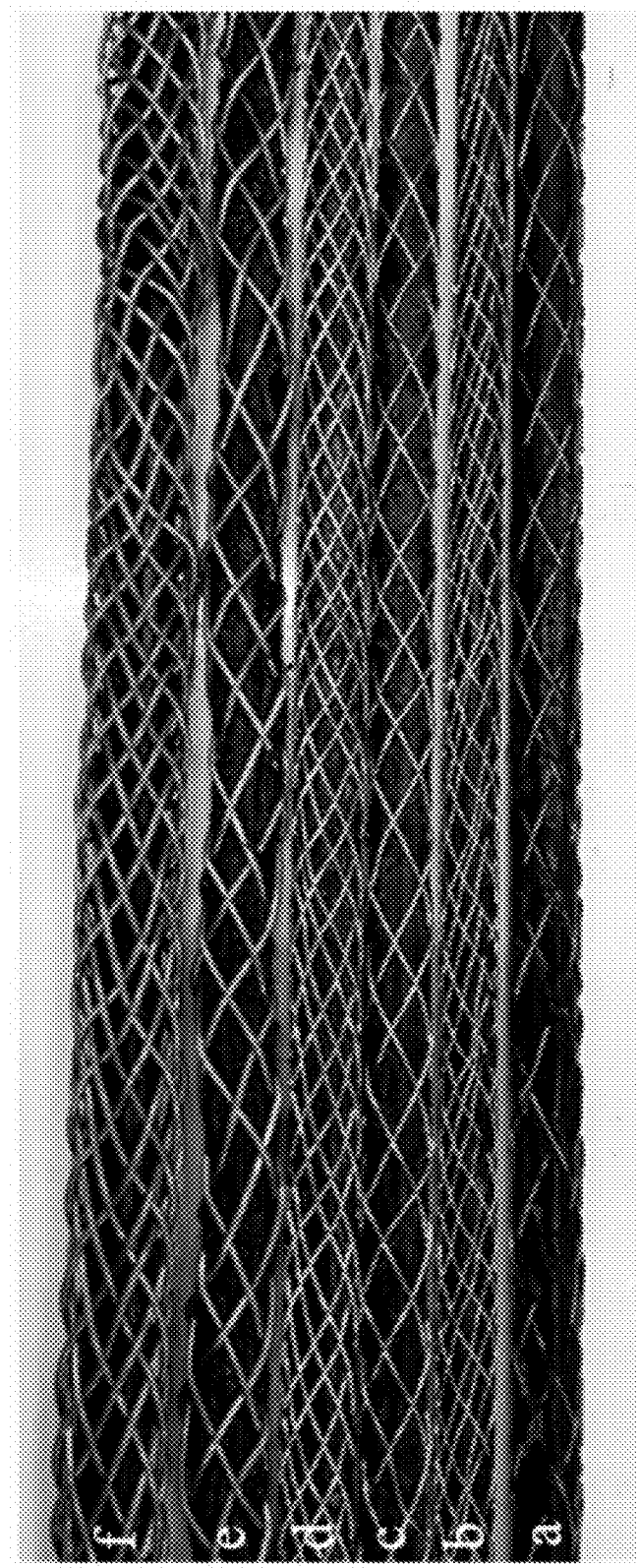
FIG. 3 illustrates examples of a tow with overbraided copper wire of various gauges and counts.

FIG. 3 illustrates examples of a tow with overbraided copper wire of various gauges and counts. From bottom to top: a) 30 AWG×8, b) 30 AWG×16, c) 24 AWG×8, d) 24 AWG×16, e) 18 AWG×8, f) 18 AWG×16. In various experimentation, 18 AWG wire was unable to embed into the tow due to the stiffness of such thick wire. In this case, the over braid formed a "cage" around the tow.

Figure 4:
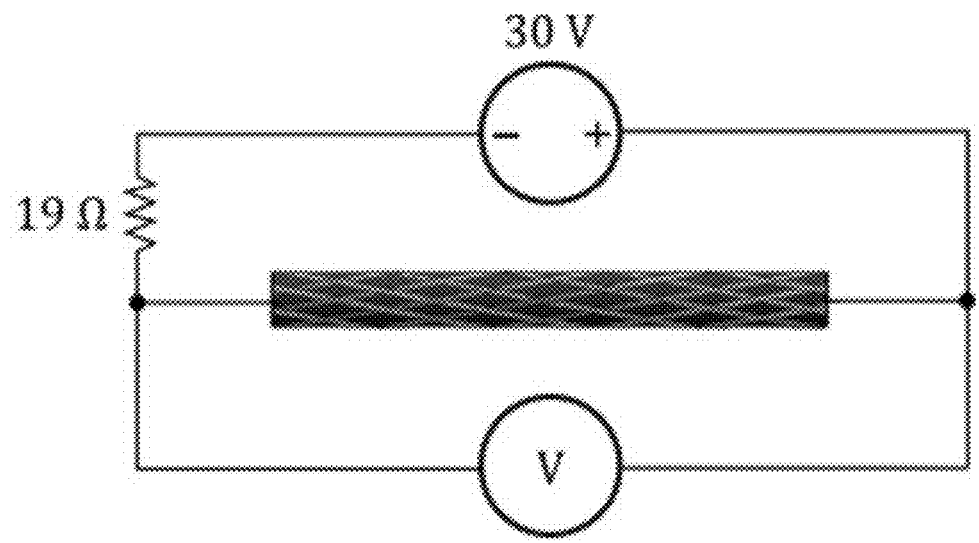
FIG. 4 illustrates an example of a test setup for the determination of electrical conductivity of the overbraded tow

FIG. 4 illustrates an example of a test setup for the determination of electrical conductivity of the overbraded tow. A DC power supply was used to provide constant 30 V (1.57 A) to the system. Resistors with a total of 19 Ω resistance rated at 25 W were placed in series with the M-TOW sample. A voltmeter was used to measure the voltage drop across the sample which was used to calculate the sample resistance using Ohm's law. Twenty measurements were taken on each sample for the purpose of statistical analysis of the results.

Once the voltage drop across the sample was measured, the conductivity of the M-TOW was calculated and compared to the theoretical conductivity of pure copper wire. For a measured voltage drop V at an applied current I, the conductivity σ can be determined:

$$\sigma = \frac{LI}{AV} \quad [1]$$

σ=conductivity, L=length, and A=cross-sectional area of wire. An overview of the parameters used during testing are provided in Table 2.

To ensure the persistence of the electrical conductivities in-situ, the original composite preform rods were formed and resubjected to electrical conductivity testing. The length of the samples varied for each test and the samples were tested both before and after forming. The formed specimens were heated and wrapped 1.5 times around an injection-molded polyamide 66 bushing at an exit angle of 40 degrees.

TABLE 2

Testing parameters used for calculating sample conductivity

| Sample description | AWG | Wire diameter (mm) | # wires used | Total area (m$^2$) | Theoretical Resistance @ 20° C. (Ωm$^{-1}$) |
|---|---|---|---|---|---|
| 30 AWG × 8 | 30 | 0.254 | 8 | 4.05 × 10$^{-7}$ | 0.3385 |
| 30 AWG × 16 | | | 16 | 8.11 × 10$^{-7}$ | |
| 24 AWG × 8 | 24 | 0.51 | 8 | 1.64 × 10$^{-6}$ | 0.0842 |
| 24 AWG × 16 | | | 16 | 3.28 × 10$^{-6}$ | |
| 18 AWG × 8 | 18 | 1.024 | 8 | 6.58 × 10$^{-6}$ | 0.0209 |
| 18 AWG × 16 | | | 16 | 1.32 × 10$^{-5}$ | |

To verify the theoretical conductivities of pure copper, 3 m of single-strand wire for each gauge were tested with the same setup shown in FIG. 4. The results of these tests demonstrated that the testing procedure can accurately measure electric conductivity.

The testing for thermal conductivity of the samples was done in accordance with ASTM standard D5930 on the TCi Thermal Conductivity Analyzer supplied by C-Therm Technologies Ltd. This analyzer uses a Modified Transient Plane Source (MTPS) nondestructive technique to determine the thermal conductivity of the material. The sample was placed over the one-sided heating/sensor coil and an additional weight was placed on top of the sample to promote closer contact with the coil. A known current was applied to the coil which directly heats the sample. As the temperature increases at the interface between the sensor coil and the sample, the voltage drops in the sensor coil. This voltage drop is monitored and calibrated to the sample's thermal conductivity and results are reported in real time and no regression analysis is needed.

The tests were performing using M-TOW samples, previously discussed. It is recommended that the 18 mm diameter heating/sensor coil on the analyzer is fully covered by the sample. Because the M-TOW samples have a 9 mm diameter, three specimens were bound together to create one sample. The specimens were cut to a length of 40 mm using a sectioning saw to provide a smooth surface and prevent the polymer from melting during cutting. Three samples from each batch (30 AWG×8, 30 AWG×16, 24 AWG×8, 24 AWG×16, GF reference) were tested and compared.

Samples were prepped and tested for thermal conductivity using the TCi Thermal Conductivity Analyzer. The heating/sensor coil is located on the bottom of the TCi Thermal Conductivity Analyzer and a weight is placed on top the sample to promote close contact to the coil.

The theoretical thermal conductivity of the samples can be calculated using rule of mixtures:

$$K_L = K_c V_c + K_b V_b \quad [2]$$

where $K_L$, $K_c$, and $K_b$ represent the resulting longitudinal, composite, and braid thermal conductivities, and $V_c$ and $V_b$ represent the composite and braid volume fractions, respectively.

Results

Figure 5:
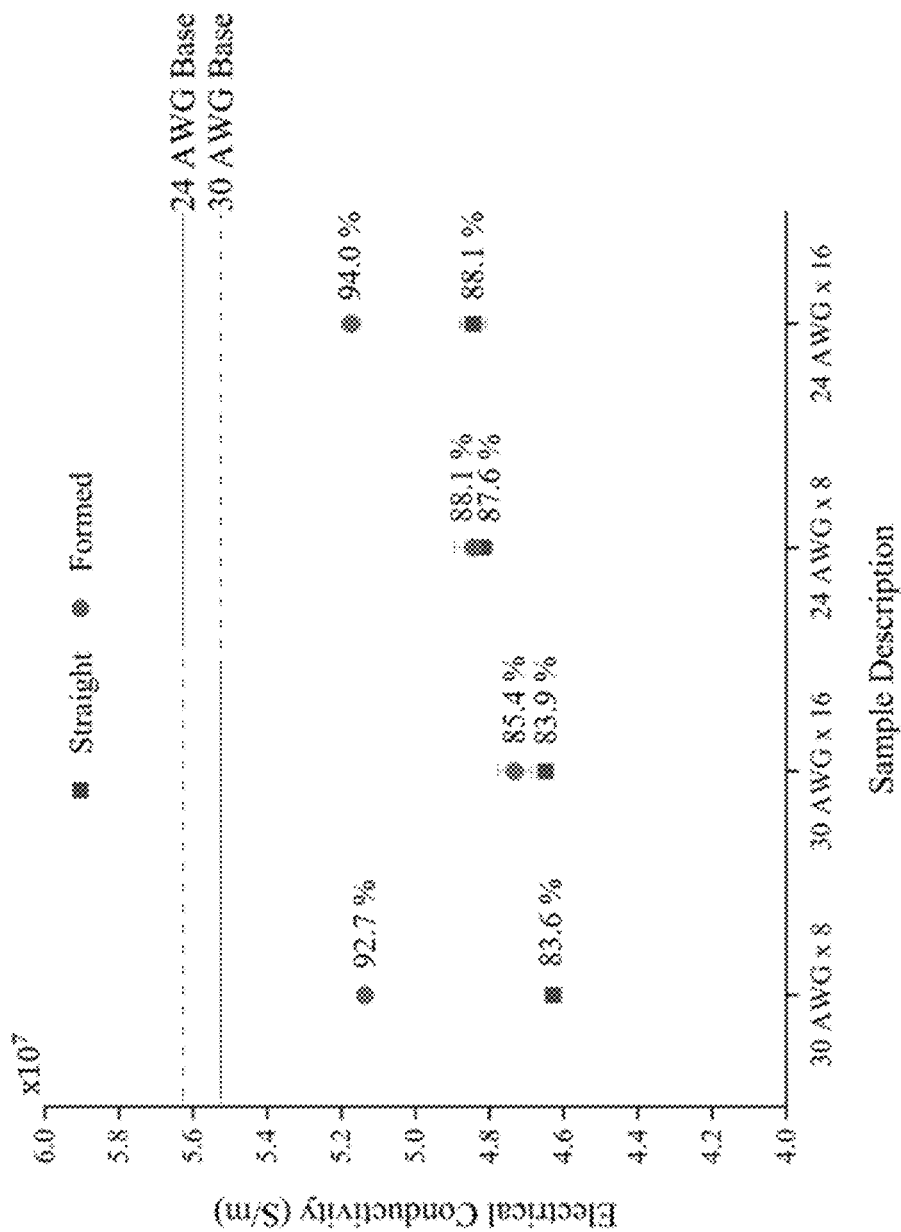
FIG. 5 illustrates the results of the electrical conductivity tests for the samples before and after forming.

FIG. 5 illustrates the results of the electrical conductivity tests for the samples before and after forming. For all tests, the formed samples displayed higher conductivity than the straight samples. This phenomenon is due to increased contact between the wires when wrapped around the bushings which decreases the overall resistance of the sample, thus increasing conductivity. As the wire size and number of wires used increases, the electrical conductivity also increases. An outlier to this trend is for 30 AWG×8 which has significantly higher conductivity than expected. Since the braid density is lowest for this sample, the tow is less constrained during forming which allows it to flatten against the bushing. This allows the wires to have increased contact, thus increasing the electrical conductivity. Future studies would adjust the temperature and force applied during forming to produce the same cross section for all samples, regardless of the braid density.

The electrical conductivity results were normalized to the measured baseline values of a single copper wire of the corresponding wire gauge to observe the effect on conductivity due to incorporation into the tow. The "base" electrical conductivity is shown for comparison in FIG. 5 and has values of 5.53×10$^7$ S/m and 5.63×10$^7$ S/m for 30 AWG and 24 AWG, respectively. The conductivity of the tested samples range from 83.6%-94% of the base values, demonstrating that the overbraiding and forming processes slightly decrease the effective conductivity of the copper wire. Little statistical error was observed in the measurements, as shown in FIG. 5. The result that the calculated conductivities fall below the baseline value is to be expected as these conductivities neglect the effect that the braid has on the copper. The true wire length will differ from the tow length due to the helical path of the braid along the tow. The resulting effective conductivity of the tow should be lower than the baseline copper value, as is seen in FIG. 5.

The theoretical thermal conductivities (K) of functional samples are provided in Table 3.

TABLE 3

Theoretical thermal conductivities of M-TOW Samples

| Sample description | Volume % of copper in tow | K (W/mK) |
|---|---|---|
| GF × 8 | 0.00 | 0.26 |
| 30 AWG × 8 | 0.70 | 2.96 |
| 30 AWG × 16 | 1.40 | 5.66 |
| 24 AWG × 8 | 2.89 | 11.40 |
| 24 AWG × 16 | 5.78 | 22.55 |

Figure 6:
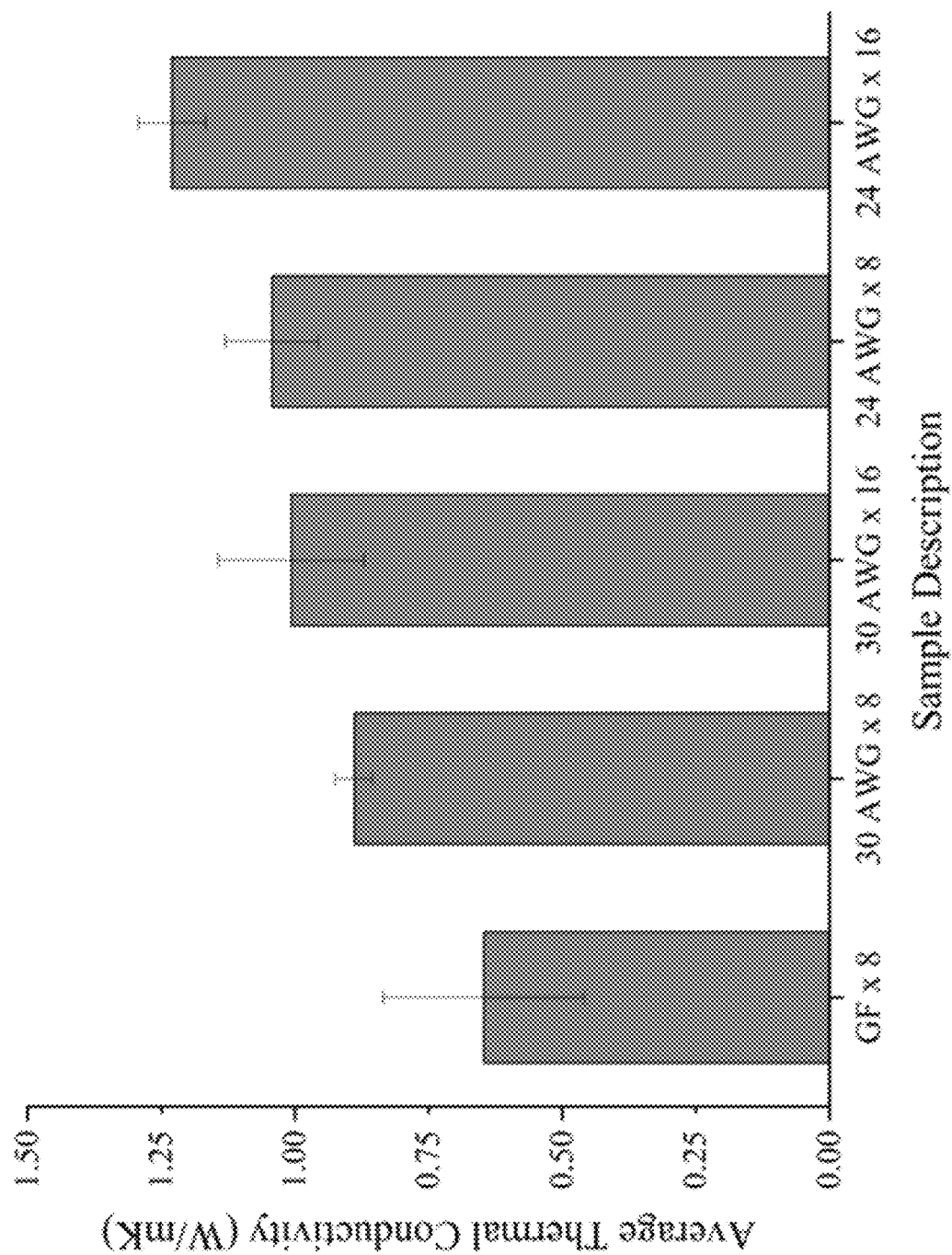
FIG. 6 illustrates experimental thermal conductivity results of copper-overbraided tow performed using a MTPS nondestructive technique.

FIG. 6 illustrates experimental thermal conductivity results of copper-overbraided tow performed using a MTPS nondestructive technique. While results were lower than the theoretical predictions presented in Table 3, there in an increasing trend of thermal conductivity with gauge size and number of wires. Experimental testing using the MTPS nondestructive technique gave results that are significantly lower than theoretically calculated due to improper sensor coverage. Because the sensor coil has a diameter of 18 mm, three samples of M-TOW® with a 9 mm diameter were bound together to create one test specimen (see FIG. 6). Due to the circular cross section of the samples, the specimen bundle has open space between each sample, resulting in incomplete contact with the sensor coil. Another reason this testing method produced inconclusive results is attributed to the poor contact between the copper wires and sensor coil. When the samples are cut to have a flat surface, the copper wires that are not fully embedded in the polymer tend to bend and migrate away from the surface, thus reducing contact with the sensor coil. Future testing will be done by potting the specimen in epoxy to constrain the wires and improve contact with the sensor.

Quantitative considerations aside, conclusions can still be drawn regarding the relative behavior of the thermal conductivities. An immediate 12% increase in thermal conductivity is seen with the incorporation of copper into the tow between GF×8 and 30 AWG×8. This increasing trend continues with the incorporation of additional copper into the system. This relationship culminates in a thermal conductivity almost double the result for the glass tow in the case of the 24 AWG×16 sample. While these results may underestimate the thermal conductivities of the samples and more precise measurements should be explored, these preliminary results suggest a promise of increasing thermal conductivity in hybrid manufactured preforms.

Cost and Weight Savings

Unlike alternative methods used to produce conductive composites where the conductive constituent is distributed throughout the entire part, the over-braided polymer composite rod described herein implemented in hybrid manufacturing where the conductive wire is placed only where the structure needs support or a conductive pathway. In a large part, the conductive wire could account for less than 5% of the total structural weight, but improve structural performance by over 200%.

The calculated cost and weight of the overbraided samples is provided in Table 4. The base GF×8 sample was produced with 40 weight % glass fiber and 60 weight % polypropylene. The cost of glass fiber and polypropylene used in the calculations was $2.00/kg and $1.10/kg, respectively. Regardless of copper size and number of wires used in the overbraid, the effect of the overbraid on the total weight is minimal. The effect of wire size influences the final cost of the structure, but when compared to other conductive composites (e.g. carbon nanotube fillers), the conductive rod remains a low cost and advantageous method to introduce conductivity to composite structures.

TABLE 4

Cost comparison for overbraided samples

| Sample description | Volume of copper (%) | Total weight of braided rod (kg/m) | Copper cost ($/kg) | Cost ($/kg) | Cost ($/m) |
| --- | --- | --- | --- | --- | --- |
| GF × 8 | 0.0 | 0.1028 | 2.00* | 6.00 | 0.62 |
| 30 AWG × 8 | 0.7 | 0.1057 | 42.06 | 7.44 | 0.79 |
| 30 AWG × 16 | 1.4 | 0.1098 | 42.06 | 8.74 | 0.96 |
| 24 AWG × 8 | 2.91 | 0.1187 | 31.59 | 9.73 | 1.16 |
| 24 AWG × 16 | 5.65 | 0.1358 | 31.59 | 12.49 | 1.70 |

*GF × 8 reflects the cost of dry E-glass fiber

This work introduced a promising approach to achieving electrical and thermal conductivity in polymer composites by introducing metallic material to the overbraiding stage. The electrical conductivity was measured before and after forming and a trend was seen where improved electrical conductivity occurs after forming, reaching 94% of the theoretical value of copper. The thermal conductivity was also measured with a trend of increasing thermal conductivity as wire size and quantity increased.

More generally, this work demonstrated that hybrid manufacturing can introduce localized, targeted functionality. If the unidirectional tow is made conductive, the preform can dissipate heat more effectively and transport electricity through the resulting part. Overall, the copper over braided samples did not introduce a high cost or weight penalty, and when coupled with hybrid manufacturing, offer a promising solution to introducing conductive pathways to composite structures.

While various embodiments have been described, it will be apparent to those of ordinary skill in the art that many more embodiments and implementations are possible. Accordingly, the embodiments described herein are examples, not the only possible embodiments and implementations.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

What is claimed is:

1. A method, comprising:
receiving a molten rod comprising a polymer composite core;
embedding the rod with at least one conductive wire by:
wrapping the at least one conductive wire around the rod; and
tensioning the at least one conductive wire thereby causing the at least one conductive wire to at least partially embed into the rod.

2. The method of claim 1, wherein the at least one conductive wire comprises a plurality of wires.

3. The method of claim 2, wherein wrapping the wires around the rod comprises overbraiding the rod with the wires by interlacing the wires around the rod.

4. The method of claim 1, wherein wrapping the at least one conductive wire around the rod further comprises:
rotating the rod along a central axis as the rod receives the least one conductive wire.

5. The method of claim 1, wherein tensioning the at least one conductive wire further comprises:
   moving the rod away from a source of the at least one conductive wire as the at least one conductive wire interlace around the rod.

6. The method of claim 1, wherein the diameter of each of the at least one conductive wire is between 0.1 mm to 4.0 mm.

7. The method of claim 1, wherein the conductivity of the rod is between $1.0 \times 10^6$ and $6.0 \times 10^7$ S/m.

8. The method of claim 1, wherein the rod comprises of a polymer and a reinforcing material.

9. The method of claim 1, wherein the at least one conductive wire comprises copper.

10. The method of claim 1, further comprising:
    bending the rod;
    including the bent rod in an automobile, consumer electronic, sport equipment, or aircraft; and
    grounding electrical components with the at least one conductive wire of the rod.

* * * * *